(12) United States Patent
Pohlmann (10) Patent No.: US 9,311,124 B2
(45) Date of Patent: Apr. 12, 2016

(54) INTEGRATED DEPLOYMENT OF CENTRALLY MODIFIED SOFTWARE SYSTEMS

(71) Applicant: SAP AG, Walldorf (DE)

(72) Inventor: Michael Pohlmann, Heidelberg (DE)

(73) Assignee: SAP SE, Walldorf (DE)

( * ) Notice: Subject to any disclaimer, the term of this patent is extended or adjusted under 35 U.S.C. 154(b) by 225 days.

(21) Appl. No.: 14/074,335

(22) Filed: Nov. 7, 2013

(65) Prior Publication Data

US 2015/0128132 A1    May 7, 2015

(51) Int. Cl.
| | |
|---|---|
| G06F 9/455 | (2006.01) |
| G06F 9/46 | (2006.01) |
| G06F 15/177 | (2006.01) |
| G06F 15/173 | (2006.01) |
| H04L 29/08 | (2006.01) |

(52) U.S. Cl.
CPC ............ *G06F 9/45533* (2013.01); *H04L 67/10* (2013.01); *H04L 67/16* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 4,611,280 A | 9/1986 | Linderman | |
| 5,668,992 A | 9/1997 | Hammer et al. | |
| 6,304,867 B1 | 10/2001 | Schmidt | |
| 7,139,745 B2 | 11/2006 | Nakamura et al. | |
| 7,325,015 B2 | 1/2008 | Zhou et al. | |
| 7,457,807 B2 | 11/2008 | O'Conor | |
| 7,533,380 B2 | 5/2009 | Neuer et al. | |
| 7,577,722 B1 * | 8/2009 | Khandekar et al. | 709/220 |
| 7,624,114 B2 | 11/2009 | Paulus et al. | |
| 7,725,483 B2 | 5/2010 | Poyourow et al. | |
| 7,774,369 B2 | 8/2010 | Herzog et al. | |
| 7,870,499 B2 | 1/2011 | Latzina et al. | |
| 8,135,813 B2 | 3/2012 | Gonzalez et al. | |
| 8,176,094 B2 * | 5/2012 | Friedman | 707/803 |
| 8,200,557 B2 | 6/2012 | Kahn et al. | |
| 8,255,350 B2 | 8/2012 | Lindenlaub | |
| 8,321,948 B2 | 11/2012 | Robinson et al. | |
| 2003/0126130 A1 | 7/2003 | Martino et al. | |

(Continued)

FOREIGN PATENT DOCUMENTS

| | | |
|---|---|---|
| EP | 2019358 A1 | 1/2009 |
| EP | 2722754 A1 | 4/2014 |

(Continued)

OTHER PUBLICATIONS

"U.S. Appl. No. 13/902,666, Non Final Office Action mailed Dec. 18, 2014", 18 pgs.

(Continued)

*Primary Examiner* — Meng An
*Assistant Examiner* — Bing Zhao
(74) *Attorney, Agent, or Firm* — Schwegman Lundberg & Woessner, P.A.

(57) ABSTRACT

Various embodiments here in provide systems, methods, and software for integrated management of centrally modified software systems. Some embodiments include a landscape virtualization management application through which software systems in the form of virtual appliances may be selected, deployed, and started. The virtual appliance in such embodiments may have been transported to an implementing organization, encapsulated in a virtual appliance, in a preconfigured and pre-modified form.

15 Claims, 6 Drawing Sheets

(56) References Cited

U.S. PATENT DOCUMENTS

| | | |
|---|---|---|
| 2003/0167455 A1 | 9/2003 | Iborra et al. |
| 2005/0021543 A1 | 1/2005 | Schmitt et al. |
| 2005/0262059 A1 | 11/2005 | White |
| 2007/0027867 A1 | 2/2007 | Ichino |
| 2007/0130031 A1 | 6/2007 | Esau et al. |
| 2007/0226227 A1 | 9/2007 | Helfman |
| 2007/0233820 A1 | 10/2007 | Schneider |
| 2007/0276948 A1 | 11/2007 | Burdett et al. |
| 2009/0249279 A1 | 10/2009 | Bourdon |
| 2009/0300586 A1 | 12/2009 | Bernardini et al. |
| 2009/0300593 A1 | 12/2009 | Faus et al. |
| 2010/0005461 A1 | 1/2010 | Shribman et al. |
| 2010/0191764 A1 | 7/2010 | Aluf-Medina |
| 2011/0320451 A1 | 12/2011 | Boh et al. |
| 2012/0005190 A1 | 1/2012 | Faerber et al. |
| 2012/0051535 A1 | 3/2012 | Klein et al. |
| 2012/0179698 A1 | 7/2012 | Muras |
| 2012/0323923 A1 | 12/2012 | Duan |
| 2014/0143260 A1 | 5/2014 | Simonson et al. |
| 2014/0351272 A1 | 11/2014 | Kemmler |

FOREIGN PATENT DOCUMENTS

| | | |
|---|---|---|
| WO | WO-2005072047 A2 | 8/2005 |
| WO | WO-2005073876 A2 | 8/2005 |

OTHER PUBLICATIONS

"European Application Serial No. 141913053.3., Search Report mailed Mar. 16, 2015", 10 pgs.

"U.S. Appl. No. 13/902,666, Decision on Pre-Appeal Brief mailed Nov. 3, 2015", 2 pgs.

"U.S. Appl. No. 13/902,666, Final Office Action mailed Jul. 31, 2015", 22 pgs.

"U.S. Appl. No. 13/902,666, Pre-Appeal Brief filed Oct. 5, 2015", 5 pgs.

"U.S. Appl. No. 13/902,666, Response filed Apr. 8, 2015 to Non Final Office Action mailed Dec. 18, 2014", 23 pgs.

"European Application Serial No. 14191305.3, Office Action mailed Aug. 24, 2015", 13 pgs.

\* cited by examiner

```
// VIRTUAL APPLIANCE METADATA
<?xml version="1.0"?>

<VAF-SAP-APPLIANCE>

<APPLIANCE-DIRECTORY>
SCM702-730-A-02-ADA-78-SL111-0
</APPLIANCE-DIRECTORY>

<APPLIANCE-DESCRIPTION>
<SAPPRODUCT>SCM 7.02 on SAP 730 ABAP</SAPPRODUCT>
<OS>SUSELinux</OS>
<OSRELEASE>11</OSRELEASE>
<OSPATCHLEVEL>1</OSPATCHLEVEL>
<OSKERNEL>2.6</OSKERNEL>
<GLIBC>GLIBC_2.3.4</GLIBC>
<SAPKERNEL>720 PL 68</SAPKERNEL>
<SAPHOSTAGENT>720 PL 44</SAPHOSTAGENT>
<SID>S70</SID>
<SNCI>72</SNCI>
<STACK-TYPE>ABAP</STACK-TYPE>
<DB-TYPE>SAPDB</DB-TYPE>
<DB-VERSION>7.8.1.16</DB-VERSION>
<HOSTNAMEDB>dbs70</HOSTNAMEDB>
<HOSTNAMECI>cis70</HOSTNAMECI>
<GROUPSAP>sapsys</GROUPSAP>
<GROUPSAPID>79</GROUPSAPID>
<GROUPDB>sdba</GROUPDB>
<GROUPDBID>85</GROUPDBID>
<USERSAP>sapadm</USERSAP>
<USERSAPID>1998</USERSAPID>
<USERDAA>daaadm</USERDAA>
<USERDAAID>1999</USERDAAID>
<USERSID>s70adm</USERSID>
<USERSIDID>2072</USERSIDID>
<SIZEDB>140.0GB</SIZEDB>
<SIZEUSRSAP>10.0GB</SIZEUSRSAP>
<SIZESAPMNT>2.0GB</SIZESAPMNT>
<SIZETOTAL>152.0GB</SIZETOTAL>
<SWAPSIZE>32.0GB</SWAPSIZE>
<INODESIZE>17779</INODESIZE>
<SAPDOMAIN>sapcoe.sap.com</SAPDOMAIN>
</APPLIANCE-DESCRIPTION>

<APPLIANCE-SLD-DATA>
<SAP-PRODUCT-DESCRIPTION>
<PRODUCTIDENTIFYINGNUMBER>01200314690900000803</PRODUCTIDENTIFYINGNUMBER>
<PRODUCTIDENTIFYINGNUMBER>01200314690900001617</PRODUCTIDENTIFYINGNUMBER>
<PRODUCTIDENTIFYINGNUMBER>01200615320900001296</PRODUCTIDENTIFYINGNUMBER>
<PRODUCTIDENTIFYINGNUMBER>01200615320900003612</PRODUCTIDENTIFYINGNUMBER>
<PRODUCTIDENTIFYINGNUMBER>01200615320900001783</PRODUCTIDENTIFYINGNUMBER>
<PRODUCTIDENTIFYINGNUMBER>01200615320900001286</PRODUCTIDENTIFYINGNUMBER>
<PRODUCTIDENTIFYINGNUMBER>01200314690900000843</PRODUCTIDENTIFYINGNUMBER>
<PRODUCTIDENTIFYINGNUMBER>01200615320900001240</PRODUCTIDENTIFYINGNUMBER>
</SAP-PRODUCT-DESCRIPTION>
</APPLIANCE-SLD-DATA>

</VAF-SAP-APPLIANCE>
```

INTEGRATED DEPLOYMENT OF CENTRALLY MODIFIED SOFTWARE SYSTEMS

BACKGROUND INFORMATION

Organizations today typically utilize large, complex software systems to manage many parts of their operations. Some such software systems include Enterprise Resource Planning (ERP), Customer Relationship Management (CRM), Human Capital/Resource Management (HCM/HRM), and the like. An example developer and supplier of such systems is SAP AG of Walldorf, Germany. Common amongst these systems is their large scale and high flexibility to many possible different scenarios for supporting organizational processes and policies. However, with their large scale and high flexibility comes not only complexity, but also expense and risk for both deployment and maintenance. The expense and risk are also compounded by the amount of time needed to deploy, configure, and customize such software systems.

BRIEF DESCRIPTION OF THE DRAWINGS

FIG. 4 is a virtual appliance metadata file, according to an example embodiment.

DETAILED DESCRIPTION

Organizations desiring to add, or add to, a complex software system, such as an Enterprise Resource Planning (ERP), Customer Relationship Management (CRM), or Human Capital/Resource Management (HCM/HRM) software system, typically install an instance of the software system and then have the system configured and customized to organizational needs, policies, legal requirements, and the like. However, as discussed above, such implementation tasks can be cost, time, and risk intensive, which is further compounded by needed maintenance effort. To reduce cost, time, and risk, virtual appliances are utilized.

A virtual appliance is generally a template of an application that may exist for an entire computing application (e.g., an ERP, CRM, HRM applications), add-ons or enhancements to an application (e.g., business intelligence module, mobile module, language or other application localization module or content, warehouse management, logistics processes), content (e.g., key performance indicators, promotional campaign definitions, compliance requirements, workflow processes), data (e.g., contact lists), and the like. Virtual appliance templates are generally pre-assembled, pre-configured, and pre-tested for their respective purposes. As such, virtual appliances are appliance-like in that they can essentially be "plugged-in" and they function for their intended purpose. Virtual appliances typically include binaries, configuration data, content files, and data files that can be instantiated on a virtual machine, or other computing device, that includes a minimal amount of preinstalled software. For example, the minimal amount of preinstalled software may include only an operating system or a virtual machine, also referred to generally herein as an operating system. In some embodiments, a virtual appliance may include not only binaries, configuration data, content files, and data files of the application or software system of the virtual appliance, but also ancillary software systems that the software system of the virtual appliance relies upon during execution, such as a database management system.

Virtual appliances can be transported rapidly, such as over a network or on a detachable storage device (i.e., external USB hard disk, memory stick, optical disc, etc.). Virtual appliances, once transported to their destination are then rapidly deployable and are immediately functional. However, while virtual appliances can be pre-customized and preconfigured for very specific industries and industry segments, virtual appliances are still typically generic implementations of the software systems included therein in many regards and are in need of additional configuration and customization to meet the needs of the particular organization. The additional configuration and customization to date has been performed onsite or by integrators having connectivity to the instantiated system and requires the system be instantiated for the organization to allow for configuring and customizing.

Various embodiments herein include at least one of systems, methods, and software for building and transporting centrally configured and modified software systems. Such embodiments provide for a virtual appliance to be configured and customized prior to transport of the virtual appliance to the target organization. Once configured and customized, the software system of the virtual appliance is reassembled into a virtual appliance, transported, and rapidly deployed in a form as needed by the organization. This results in significant cost, time, and risk exposure mitigation.

Some additional embodiments include a virtualization management functions that may be included in a standalone virtualization management application or included in whole or in part in one or more other portions of software, such as utilities and administrative tools of an operating system or virtual machine. Such virtualization management functions may include functions to allow starting and stopping of software systems, relocation of a software system between computing environments (i.e., from one virtual machine to another), software system copying, software system cloning, and the like. The virtualization management functions may also include maintaining a virtual appliance repository into which virtual appliances may be imported, stored, cataloged in a searchable manner, copied to a virtual or physical computing landscape, and attached to a virtual machine or physical computing device. Such embodiments provide administrators great flexibility in managing software systems deployed within one or more computing environments, whether the computing environments are physical computing landscapes where software system are deployed to one or more physical computing devices or virtual computing landscapes where software systems are deployed to one or more virtual machines.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
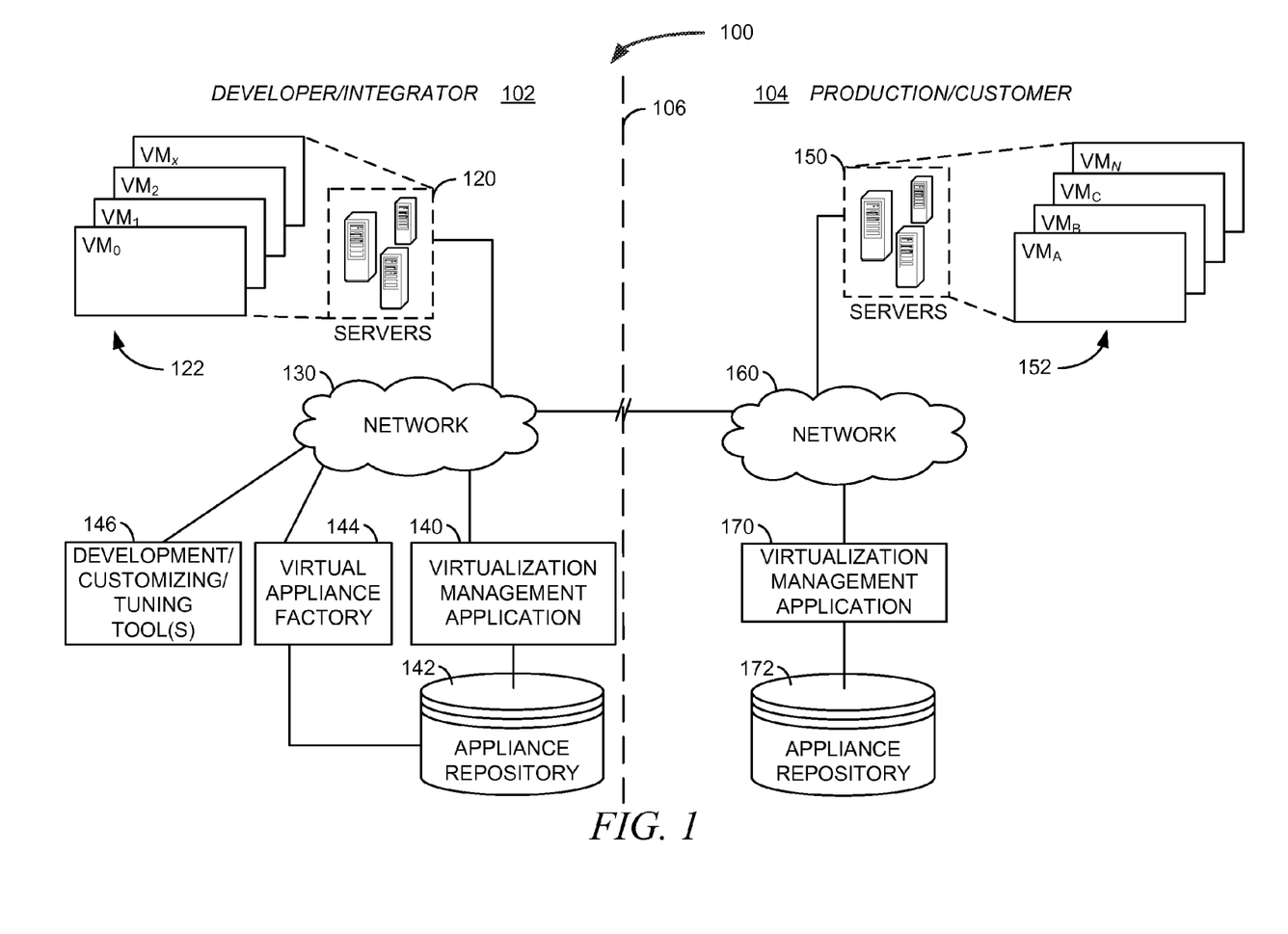
FIG. 1 is a logical block diagram of virtual computing landscape, according to an example embodiment.

FIG. 1 is a logical block diagram of virtual computing landscape 100, according to an example embodiment. Virtual computing landscapes may take different forms, and as such, the virtual computing landscape 100 is provided merely as one example.

The virtual computing landscape 100 includes a developer/integrator portion 102 and a production/customer portion 104. The developer/integrator portion 102 is a computing environment within which a software development organization or a system integrator utilizes to develop, configure, customize, and test, software systems and virtual appliances. The production/customer portion 104 is a computing environment of or contracted by a customer that procures a software system from the developer or integrator of the developer/integrator portion 102.

The developer/integrator portion 102 includes a network 130 to which various computing devices and software systems are connected. The network 130 may include one or more of a local area network, wide area network, system area network, the Internet, and other network types. The various computing devices connected to the network 130 typically include one or more servers 120.

The servers 120 may have software systems deployed directly to the hardware or operating system of a respective server. However, in some embodiments, one or more of the servers 120 may provide a virtual computing environment within which one or more virtual machines 122 may exist and on, or within, which software systems may be deployed. In some embodiments, there may be a plurality of servers 120 providing a variety of different types of virtual machine computing environments on which software systems may be deployed. This allows the developer/integrator portion 102 to be utilized to tailor software systems for deployment to various different types of virtual machine computing environments of particular target organizations or hosted computing environments of different hosted computing environment (sometimes referred to as cloud-computing) providers.

In some embodiments, each of the one or more servers 120 or one or more virtual machines thereon provide a cloud-computing environment. Each cloud-computing environment is a network resource accessible via the network 130. The cloud-computing environments generally provide one or both of computing and storage capacity via the network 130 as services. A cloud-computing environment typically includes a virtualized environment that is logically distinct from other computing environments that may execute on the same hardware, but are each individually accessible. Thus, one cloud-computing environment may include a hardware set, such as one or more server 120 computers having one or more virtual machines that each provide a computing environment within which computer applications, such as software systems, may execute. In some embodiments, an application server or other process within which data and service requests may be received via the network 130 and serviced execute within a virtual machine, as discussed previously. A cloud-computing environment may also include a database or other data storage application or arrangement logically located therein.

Also connected to the network may be one or more development, customizing, and tuning tools 146. Such tools 146 are utilized by system administrators, developers, integrators, and the like to modify, add to, augment, or otherwise make changes or additions to software systems deployed on the one or more servers 120 or virtual machines thereon. The tools 146 are typically utilized to perform such actions with regard to software systems, content, configuration settings, and the like deployed or otherwise stored to one or more virtual machines resident on one or more of the servers 120 or deployed directly on the hardware of one or more of the servers 120. Although illustrated distinctly from the one or more servers 120, the tools 146 may be deployed on one or more of the one or more servers 120 or on a different computing device present within the developer/integrator portion 102 or in another computing environment.

In operation, a software system may be deployed to one or more of the servers 120 or virtual machines present thereon. The deployment may be from a standard installation media, such as an optical disc, of the software system to be deployed. This may also include deployment of a database management system and other ancillary systems or programs that the deployed software system may rely upon or otherwise interact with when deployed. In other embodiments, a virtual appliance may be instantiated on the one or more servers 120 or one or more virtual machines present thereon.

Once a software system is deployed, the development, customizing, and tuning tools 146, when present in the particular embodiment, may then be utilized to tailor the software system for a particular target organization. A target organization is an entity that has procured, or is otherwise considering procurement of, the deployed software system. The tools 146 are utilized to tailor the software system to meet the business, legal, functional, policy, and other requirements and needs of the target organization. The software system may then be tested to ensure it is properly functional, evaluated by the target organization for compliance, and the subject of other quality and acceptance processes, depending on the particular embodiment.

Once the software system is deemed acceptable, a virtual appliance factory 144 may execute to generate a new virtual appliance from the software system. The virtual appliance factory 144 may be triggered to execute based on input and commands received via a virtualization management application 140. The virtualization management application 140 and the virtual appliance factory 144, in typical embodiments, are deployed and execute on a computing device, such as one or more of the servers 120. In other embodiments, one or both of the virtualization management application 140 and the virtual appliance factory 144 are deployed outside of the developer/integrator portion 102 and connect via a network, such as an Internet connection to the network 130.

In some embodiments, the virtual appliance factory 144, upon receipt of a command to generate a virtual appliance with regard to a particular deployed software system, will first stop execution of the software system and any ancillary software systems thereof, such as a database management system. In some such embodiments, rather than stopping execution, the virtual appliance factory 144 may instead simply block access thereto to prevent data access and modifications to the software system and its configuration. Regardless, after the software system is stopped or locked, the virtual appliance factory 144 may analyze the software system to identify a structure thereof. This typically includes identifying the constituent portions of the software system, such as files, data, configuration settings, and a folder and data storage structure where the constituent portions are stored. A virtual appliance data structure may then be generated and an equivalent folder and data storage structure generated therein. The identified constituent portions of the software system are then copied to the virtual appliance data structure and the structure generated therein. Metadata is then typically generated to include data descriptive of the software system included in the virtual appliance, minimum resource requirements for a computing device or virtual machine to which the virtual machine may be attached, user accounts to be established, and configuration settings. The metadata may include a lesser or greater amount of data depending on the particular embodiment. The metadata is added to the virtual appliance data structure and the virtual appliance data structure is stored, such as to a virtual appliance repository. The software system may then be restarted or unlocked.

The virtualization management application 140 may be utilized for various purposes with regard to virtual and non-virtual computing environments, management thereof, and deployment thereto. In particular, the virtualization management application 140 may provide an administrator view of software systems deployed to the one or more servers 120 and virtual machines thereon, which may include various views including data representative of a customization status of a software system. Thus, when a software system is deemed acceptable, the acceptable status may be reflected within a view of the virtualization management application 140. The virtualization management application 140 may then provide one or more user interface tools to perform various functions, such as to generate a virtual appliance from the acceptable software system by calling one or more services that may be provided by the virtual appliance factory.

Additionally, the virtualization management application 140, in some embodiments, includes a suite of tools, some of which may include user interfaces, for managing virtual computing landscapes. A virtual computing landscape is generally a virtual computing environment within which there are computing devices on which virtual machines may be instantiated and computing resources, such as processors, storage, and the like that may be allocated to virtual machines. Tools of the virtualization management application 140 may include tools to start and stop software systems, instantiate and dis-instantiate virtual machines, allocate, reallocate, and dis-allocate resources thereto, to relocate or copy software systems between computing environments, clone software systems, and the like. The virtualization management application may also include tools for maintaining a virtual appliance repository 142 into which virtual appliances may be imported, stored, cataloged in a searchable manner, copied to a virtual or physical computing landscape, attached to and detached from a virtual machine or physical computing device, and replicated from one or more virtual machines or physical computing devices to one or more other virtual machines or physical computing devices. Such embodiments provide administrators great flexibility in managing software systems deployed within one or more computing environments, whether the computing environments are physical computing landscapes where software system are deployed to one or more physical computing devices, virtual computing landscapes where software systems are deployed to one or more virtual machines, or a combination of both.

Some embodiments include a user interface tool to generate a virtual appliance from a deployed software system. The user interface in such embodiments may request various inputs. For example, the user interface tool may request information regarding a mode of transport for the virtual appliance to be generated, various elements of the software system to include in the virtual appliance (i.e., whether or not to include the database management system or just certain data stored therein), and other information depending on the particular embodiment.

The mode of transport, in some such embodiments, may include a selection of or specification of a network location to which the virtual appliance is to be transmitted. The mode of transport may also include an ability to specify a storage device, and a type thereof, to which the virtual appliance is to be stored. For example, the storage device may be a network drive, a drive of a local computing device, a Universal Serial Bus (USB) device such as a hard disk or a memory stick or card, or an optical disc.

Once such information is received within this user interface tool of the virtualization management application 140, the virtual appliance factory 144 may be triggered. The virtual appliance factory 144 then proceeds to generate and store a virtual appliance data structure. The virtual appliance data structure will typically include various forms of data. For example, the virtual appliance data structure in some embodiments includes binaries and executable files of the software system along with configuration data, content, and other data as present in the one or more computing environments, virtual or otherwise, to which the software system is deployed. The virtual appliance data structure in such embodiments may also include metadata identifying the contents of the virtual appliance data structure, virtual machine or operating system variables identifying properties of a computing platform from which the software system was copied. The metadata may further include database management system compatibility information, data identifying a database management system and other ancillary systems and programs included in the virtual appliance data structure, and data defining a data storage structure to be generated and into which various elements of the virtual appliance data structure are to be deployed. Other data may be included in the metadata to assist in deployment, cataloging, tracking, and other such purposes of the virtual appliance of the virtual appliance data structure. The virtual appliance factory 144 stores the virtual appliance data structure to an appliance repository 142 and may further store the virtual appliance data structure to other locations. For example, when the virtualization management application 140 receives input via the user interface tool, discussed above, specifying a mode of transport, the virtual appliance data structure may be stored to a particular location (i.e., a particular folder or to a particular USB device).

Similarly, when a software system deployed within a computing landscape, such as a virtual computing landscape, is to be replicated or moved to another machine, the virtualization management application 140 may utilize the same or a different user interface tool that is tailored to the specific purpose or includes options that tailor the specific task of relocating or copying the software system. Such options request input with regard to a machine, either virtual or physical, to which the software system is to be copied or relocated. Some such embodiments include one or more options for choosing a virtual machine hosted by a third party. Such options may include an option to select a previously procured third-party hosted virtual machine. In some embodiments, the options further include an ability to procure a third-party hosted virtual machine. The user interface and the virtualization management application 140 may be adapted to communicate with one or more third-party virtual machine hosts via a defined interface, web services, or other data interfaces accessible via a network.

The appliance repository 142 may simply be a data storage device accessible via the network 130 that stores virtual appliance data structures. In other embodiments, the appliance repository 142 may be a data storage repository, such as a hard disk, and includes, or otherwise utilizes, a database management system providing an indexed and searchable data set of stored virtual appliance data structures. The database in such embodiments may be populated with data copied from the metadata of each stored virtual appliance data structure. In such embodiments, the virtualization management application 140 may provide abilities to search and select preexisting virtual appliances stored in the appliance repository 142 for deployment, modification, transport, and other purposes.

Referring now to the production/customer portion 104, as briefly mentioned above, the production/customer portion 104 is a computing environment of or contracted by a customer that procures a software system from the developer or integrator of the developer/integrator portion 102. For example, the production/customer portion 104 may be a computing environment maintained by the customer, also referred to above as the target entity. In other embodiments, the production/customer portion 104 may be a cloud-computing environment procured from a cloud-computing host by the customer. For example, a cloud-computing environment procured from a cloud-computing host by the customer may be a third-party hosted virtual machine.

The production/customer portion 104 includes one or more servers 150. The one or more servers 150 may include one or both of standalone servers and virtual machines 152 deployed thereon. The one or more servers are connected to a network 160. The network 160 may include one or more of a local area network, wide area network, system area network, the Internet, and other network types. In some embodiments, the network 160 may be directly or indirectly connected to the network 130 of the developer/integrator portion 102, such as to allow for transport of virtual appliance data structures.

Also connected to the network 160 is a virtualization management application 170 and an appliance repository 172. In some embodiments, the virtualization management application may be identical to the virtualization management application 140 of the developer/integrator portion 102 discussed above. However, in other embodiments, the virtualization management application 170 may be a "light" version thereof, including less than all management functions and tools described previous. However, in other embodiments, the virtualization management application 170 may include additional management functions and tools. In further embodiments, the virtualization management application 170 provides software tools for specific tasks. For example, such tasks include querying and viewing data representative of virtual appliance data structures stored in the appliance repository 172, selection of a virtual appliance data structure for deployment, and presentation and selection of one or more servers or virtual machines 152 to which a virtual appliance of the selected virtual appliance data structure is to be deployed. The virtualization management application 170 may further include one or more processes to deploy a selected virtual appliance to a selected location, to collect and store data with regard to virtual appliance deployments that have been made, and to collect and store data with regard to statuses of software systems deployed as virtual appliances.

Regardless of the functions provided by the virtualization management application 170, and similarly for the virtualization management application 140, the various views of virtual appliances stored in the respective appliance repositories 142, 172 and as deployed within the virtual computing landscape 100, or elsewhere, is facilitated by a standardized data form of metadata included in virtual appliance data structures. Further, various tools included within the virtualization management applications 140, 170 perform their respective functions based at least in part on this metadata, such as in determining resource requirements of virtual appliances when deployed, data storage structures that are to be created and populated with virtual appliance components and other data, views of available virtual appliances, user accounts to be created during an attachment process, and the like. An example of such metadata is illustrated and described with regard to FIG. 4.

Figure 2:
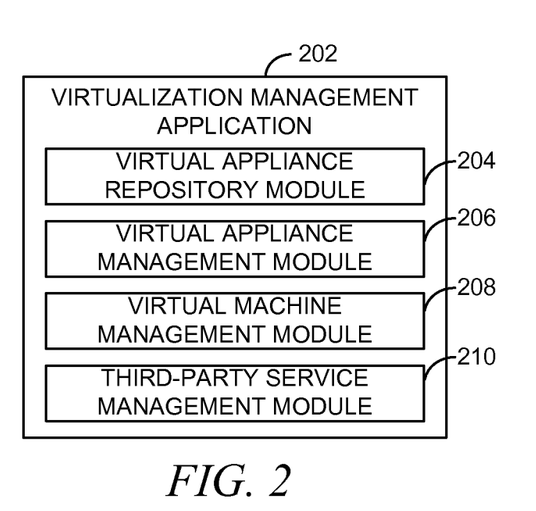
FIG. 2 is a block diagram of a virtualization management application, according to an example embodiment.

FIG. 2 is a block diagram of a virtualization management application 202, according to an example embodiment. The virtualization management application 202 is an example of the virtualization management applications 140, 170 illustrated and described with regard to FIG. 1. The virtualization management application 202 typically includes at least a virtual appliance repository module 204, a virtual appliance management module 206, and a virtual machine management module 208. In some embodiments, the virtualization management application 202 may further include a third-party service management module 210.

The virtual appliance repository module 204 is operable to receive, store, and provide virtual appliances, such as in the form of a virtual appliance data structure as discussed above. The virtual appliance repository module 204 manages virtual appliances stored in a virtual appliance repository, such as a hard disk, database, or other data storage mechanism, service, or device. A logical or user interface may operate to receive data representative of a virtual appliance data structure to be imported, receive the corresponding data, and process that data. The processing of virtual appliance data may include importing metadata descriptive of the contents and compatibilities of the virtual appliance. The importing of the metadata typically includes storing a representation of at least some of the data in an index or database table in a manner to be easily queried when a search of available virtual appliances may be performed.

The virtual appliance management module 206 is at least capable of presenting a view of virtual appliances available for deployment from an appliance repository, as managed by the virtual appliance management module 204, receive a selection of a virtual appliance for deployment, and to affect that deployment. However, in some embodiments, the virtual appliance management module 206 may be further capable of building virtual appliances from a deployed software system. Such embodiments generally also include a virtual appliance factory, such as virtual appliance factory 144 illustrated and described above with regard to FIG. 1.

In embodiments of the virtual appliance management module 206 capable of building a virtual appliances, the virtual appliance management module 206 may receive a command to detach a software system from a first computing device, such as a virtual machine, on which the software system is installed and has been configured and modified. The command may be received via a user interface of a thick client application or via a network in an embodiment where the virtual appliance management module 206 is a server based and executable module. The virtual appliance management module may then detach the software system from the first computing device by copying the software system, including executable files, configuration data, software system content, and other data into a virtual appliance data structure. Elements to be copied may be dictated by a virtual appliance management module 206, by a known virtue that the software system is the only software deployed within its computing environment, through identification of the software system and retrieval of data via a network service where the data identifies what is to be copied for the particular software system, and other programmatic, configuration, and retrievable mechanisms and algorithms. In some embodiments, copying the software system into the virtual appliance data structure includes copying all data from the first computing device except for an operating system of the first computing device and data present on the computing device only for purposes of executing, configuring, and maintaining the operating system.

The virtual appliance management module 206 may then generate a metadata file identifying the contents of the virtual appliance data structure and data defining a structure (i.e., folders, network locations, and other data storage locations) within which individual items of the contents of the virtual appliance data structure are stored and are to be generated when redeployed. The virtual appliance management module 206 may generate further metadata in the metadata file including at least a portion of the software system configuration data, such as data identifying an operating system of the first computing device on which the software system was installed and user configuration data defining user accounts and software system access privileges thereof. This additional metadata may further include data identifying minimum requirements for a computing environment within which the virtual appliance may be deployed, such as a minimum processing power, needed storage space, memory, and other system requirements. The virtual appliance management module 206, in such embodiments, may then store the virtual appliance data structure in the appliance repository, such as by triggering an import function of the virtual appliance repository module 204.

The virtual appliance management module 206, when deploying a virtual appliance, receives a command to attach the virtual appliance to a computing device, such as a virtual machine including only a virtual machine operating system or a bare metal computing device including only an operating system. In some embodiments, the virtual appliance management module 206 may receive a command including data identifying the computing device to which the virtual appliance is to be attached (i.e., deployed) and an identifier of the virtual appliance to attach. The virtual appliance management module 206 may then read data from the metadata of the identified virtual appliance and verify the computing device to which the virtual appliance is to be attached is compatible with the virtual appliance. For example, the metadata included in a data structure of the virtual appliance may identify minimums for a computing device on which the virtual appliance be deployed, such as storage space, available or allocated memory, available or allocated processing power, and the like.

When the second computing device is compatible, the virtual appliance management module 206 may connect to a storage subsystem of a virtual computing landscape of the identified computing device, such as a storage array accessible by virtual machines of which the computing device is one. The virtual appliance management module 206 may then create a structure on the storage subsystem within which to store items of the virtual appliance where the structure is created according to virtual appliance metadata defining the structure within which individual items of the contents of the virtual appliance are to be stored. Once the structure is created, the virtual appliance management module 206 copies individual items of the virtual appliance to respective data storage locations within the created structure. The virtual appliance management module 206 may further create user accounts and set user access privileges as defined in the virtual appliance metadata. At this point, the virtual appliance is an identical copy of the software system as it was at the time the virtual appliance was created from an instance on another computing device, such as through performance of a detach operation as previously described. However, some such embodiments of the virtual appliance management module 206 may further include a registration process that is executed to register the instantiated virtual appliance with other modules and processes of the virtualization management application 202. This registration may facilitate management of the instantiated virtual appliance by the other modules and processes of the virtualization management application 202, such as to perform stop, start, copy, relocate, and other such actions with regard to the instantiated virtual appliance.

The virtual machine management module 208 includes tools and process through which a virtual computing landscape may be managed. For example, various logical and user interfaces may be provided to instantiate and dis-instantiate virtual machines and allocate, reallocate, and dis-allocate resources thereto. Such resources may include processor, storage space, memory, and other computing resources. The virtual machine management module 208 may also be utilized to relocate virtual machines from one physical computing device to another physical computing device, to relocate application instances between virtual machines, and to move other data between virtual machines and computing devices. Additional functions and tools may also be included in virtual machine management module 208 in other embodiments.

The third-party service management module 210 includes tools to procure and register cloud-computing resources within the virtualization management application 202 for utilization and management by the other modules 204, 206, 208 of the virtualization management application 202. For example, there are cloud-computing hosts that offer hosted virtual machines and other computing resources that are accessible via a network, such as the Internet, once procured. The third-party service management module 210 provides abilities to procure such resources as needed, sometimes on demand, and provide connectivity information to allow virtual appliances to be deployed thereto. In such embodiments, some or all of a virtual computing landscape may be procured and accessible via information provided or as obtained and registered within the virtualization management application. Thus, when a virtual appliance is identified for deployment within an attach process of the virtual appliance management module 206, a virtual machine request may be generated thereby and provided to the third-party service management module 210. The third-party service management module 210 may then procure a virtual machine to which the identified virtual appliance is to be attached. Once procured, the connectivity information for the procured virtual machine may be provided to the virtual appliance management module 206 which will then proceed with the attach process. In some such embodiments, a request for a virtual machine provided by the virtual appliance management module 206 includes parameters defining resources needed within the virtual machine to be procured by the third-party service management module 210. For example, such parameters may be as specified in or determined from metadata included in a virtual appliance data structure.

Figure 3:
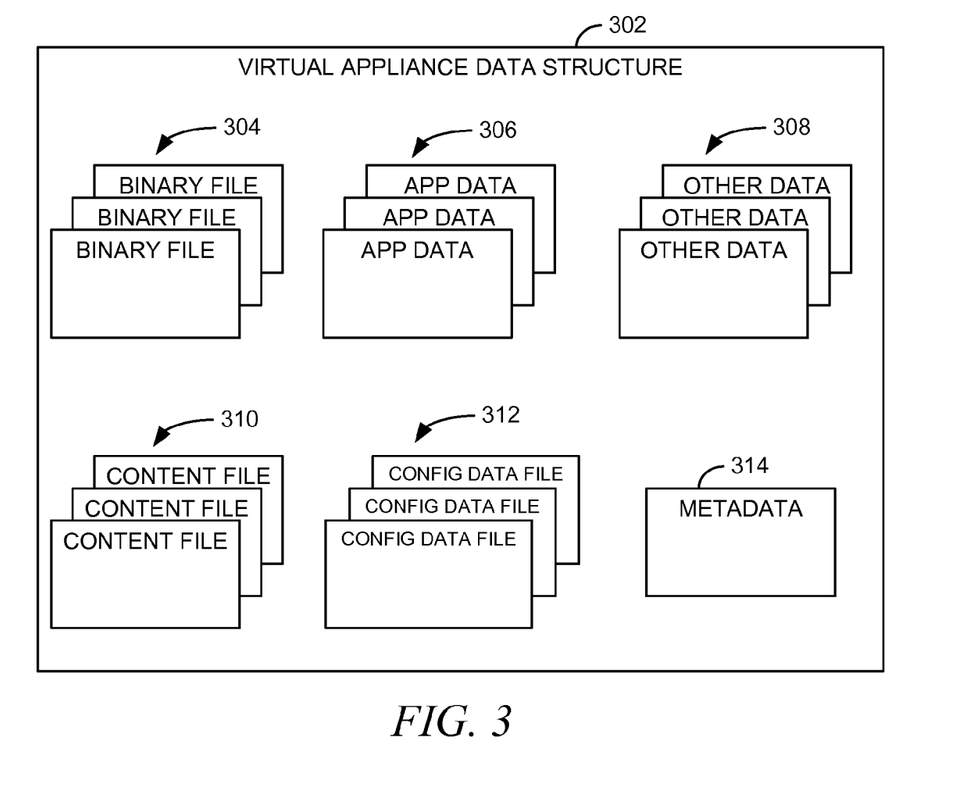
FIG. 3 is a block diagram of a virtual appliance data structure, according to an example embodiment.

FIG. 3 is a block diagram of a virtual appliance data structure 302, according to an example embodiment. The virtual appliance data structure 302 is a diagram of data elements that may be included in a virtual appliance data structure that defines a virtual appliance. This example is intended only as an illustrative example and not necessarily an example of all virtual appliance data structures.

The example virtual appliance data structure 302 includes binary files 304, application data 306, content files 310, configuration data files 312, metadata 314, and other data 308. The binary files 304 are intended to represent one or more executable files and other code files that may be script-based or compiled. The application data 306 represents data elements that may be consumed by the virtual appliance either during deployment (i.e., attachment) or during execution. The content files 310 represent various items and forms of content that may be consumed by the virtual appliance during execution and may include document templates, images, graphics, audio files, video files, training materials, and other static or dynamic content. The configuration data files 312 represent data files that store configuration data for configuring the virtual appliance during deployment (i.e., attachment) to control execution of virtual appliance. In some embodiments, the configuration data files 312 may also include preconfigured user accounts that will be established during deployment. The other data 308 represents other data that might be particular to a specific virtual appliance or application instance from which a virtual appliance is generated. The metadata 314 represents metadata as previously described herein. An explicit example of the metadata 314 according to one example embodiment is illustrated and described with regard to FIG. 4. The various elements of the virtual appliance data structure may include elements of not only a software system, but also of other components, utilities, programs, systems, and the like, including a database management system and data to be stored therein, in various embodiments.

FIG. 4 is a virtual appliance metadata file 402, according to an example embodiment. The virtual appliance metadata file 402 is an example of a metadata file that may be included in a virtual appliance data structure. The virtual appliance metadata file 402 generally includes data descriptive of the virtual appliance data structure, a virtual appliance encapsulated therein, a computing environment with which the virtual appliance is compatible (i.e., LINUX operating system release 11, patch level 1, etc.). The virtual appliance metadata file 402 may further include data defining user accounts to be generated when the virtual appliance of the virtual appliance metadata file 402 is deployed (i.e., attached). Additionally, various computing environment variables may be included in the virtual appliance metadata file 402, such as an amount of storage space needed to hold a database (<SIZEDB>) and other such parameters. Additionally of note, the illustrated virtual appliance metadata file 402 is not necessarily intended to be an entirety of such a metadata file. Thus, the length of the virtual appliance metadata file 402 is also not intended to be limiting.

Figure 5:
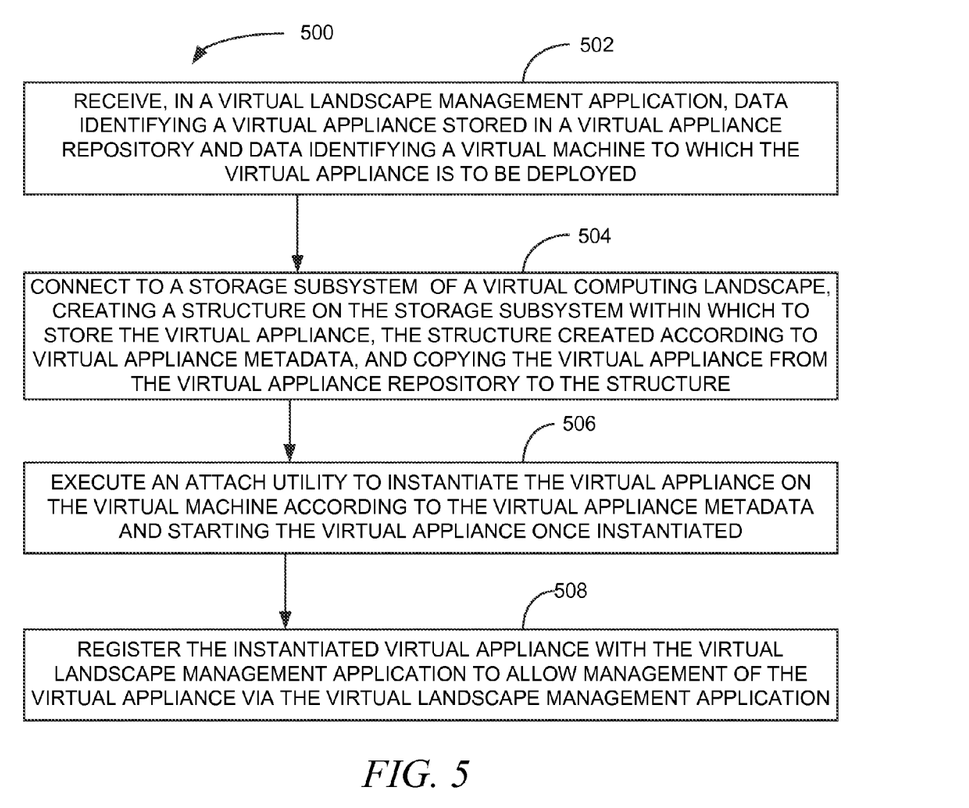
FIG. 5 is a block flow diagram of a method, according to an example embodiment.

FIG. 5 is a block flow diagram of a method 500, according to an example embodiment. The method 500 is an example of a method that may be performed by a module or process of a virtualization management application, such as virtualization management application 140 of FIG. 1 or virtualization management application 202 of FIG. 2 when deploying a virtual appliance.

The example method 500, in some embodiments, includes receiving 502, in a virtual landscape management application, data identifying a virtual appliance stored in a virtual appliance repository and data identifying a virtual machine to which the virtual appliance is to be deployed. The virtual machine may be in the same virtual computing landscape as the virtual landscape management application or another virtual computing landscape, such as a third party hosted virtual computing landscape. The method 500 may then connect 504 to a storage subsystem of the identified virtual computing landscape and create a structure on the storage subsystem within which to store the virtual appliance. The structure created is typically created according to virtual machine metadata included in a data structure of the identified virtual appliance. The method 500 may then copy the identified virtual appliance from the virtual appliance repository to the created structure.

In some embodiments, the method 500 further includes executing 506 an attach utility to instantiate the virtual appliance on the virtual machine according to the virtual machine metadata. Once instantiated, the method 500 may then start the virtual appliance to cause the virtual appliance to execute. Additionally, the method 500 may include registering 508 the instantiated virtual appliance with the virtual landscape management application to allow management of the virtual appliance via the virtual landscape management application.

As virtual machines may have computing resources allocated and de-allocated, the storage subsystem to which the method 500 connects 504, creates the structure in, and copies the virtual appliance may not be mounted to the virtual machine on which the virtual appliance will execute. Thus, in such embodiments, the storage subsystem may first be generally accessible during execution of the method 500 and following the copying and prior to or during the attach utility execution 506, the method 500 may perform a mount action to mount, or allocation, the structure created in the storage subsystem to the virtual machine.

In some further embodiments of the method 500, executing 506 the attach utility includes installing the virtual appliance on the virtual machine. Executing 506 the attach utility may further include one or more of creating users, setting user access control as defined in the virtual appliance metadata, and setting virtual hostnames.

In these and other embodiments of the method 500, the method 500 may be performed within a server process with which a user, such as an administrator interacts. The server process may provide user interfaces directly or indirectly through either a web server or data that is consumed by other user interfaces, such as may be provided by thick or thin client applications, a mobile device app, or other client application that is client or server based. In some such embodiments, receiving 502 the data identifying the virtual appliance stored in the virtual appliance repository and the data identifying the virtual machine to which the virtual appliance is to be deployed includes the server process providing first data via a network for presentation within a user interface. The first data in such embodiments is representative of virtual appliances available within the virtual appliance repository. Subsequently, data identifying the identified virtual appliance is received.

Based on the data identifying the virtual appliance and metadata of the virtual appliance, virtual machines to which the identified virtual appliance can be deployed can be determined. This determination may be based on minimum computing requirements of the identified virtual machine, as defined in the metadata, in view of available virtual machines and resources thereof. This determination may result in identification of zero to many virtual machines to which the virtual appliance may be deployed. In some embodiments, the metadata may define further rules for virtual machines on which the virtual appliance may be deployed, such as a requirement that the virtual machine have no other software deployed to it other than an operating system. The server process may then provide second data via the network for presentation in the user interface. The second data in such embodiments may be representative of determined virtual machine to which the identified virtual appliance can be deployed. Subsequently, the server process may receive the data identifying the virtual machine to which the identified virtual appliance is to be deployed.

Figure 6:
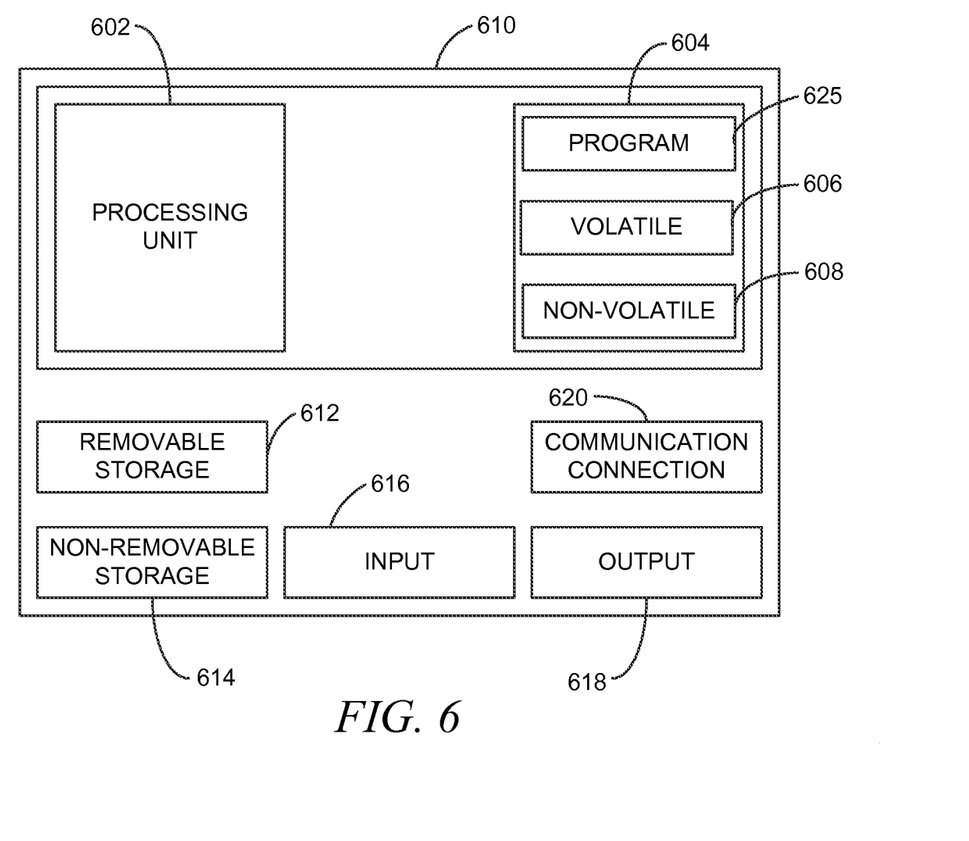
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example-computing device in the form of a computer 610, may include a processing unit 602, memory 604, removable storage 612, and non-removable storage 614. Although the example-computing device is illustrated and described as computer 610, the computing device may be in different forms in different embodiments. For example, the computing device may instead be a smartphone, a tablet, or other computing device including the same or similar elements as illustrated and described with regard to FIG. 6. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The input 616 may include one or more of a touchscreen, touchpad, mouse, keyboard, camera, and other input devices. The computer may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
  receiving, in a virtual landscape management application executable by at least one processor, data identifying a virtual appliance stored in a virtual appliance repository and data identifying a virtual machine to which the virtual appliance is to be deployed, wherein the data identifying the virtual appliance stored in the virtual appliance repository and the data identifying the virtual machine to which the virtual appliance is to be deployed is received by:
    providing first data via a network for presentation within a user interface, the first data representative of virtual appliances available within the virtual appliance repository;
    receiving the data identifying the identified virtual appliance;
    based on virtual appliance metadata of the identified virtual appliance and on a requirement that the virtual machine have no other software deployed to it other than an operating system, determining virtual machines to which the identified virtual appliance can be deployed;
    providing second data via the network for presentation in the user interface, the second data representative of determined virtual machine to which the identified virtual appliance can be deployed; and
    receiving the data identifying the virtual machine to which the identified virtual appliance is to be deployed;
  connecting to a storage subsystem of a virtual computing landscape of the identified virtual machine, creating a structure on the storage subsystem within which to store the virtual appliance, the structure created according to virtual appliance metadata of the identified virtual machine, and copying the virtual appliance from the virtual appliance repository to the created structure;
  executing an attach utility to instantiate the virtual appliance on the virtual machine according to the virtual appliance metadata and starting the virtual appliance once instantiated; and
  registering the instantiated virtual appliance with the virtual landscape management application to allow management of the virtual appliance via the virtual landscape management application.

2. The method of claim 1, further comprising:
  mounting the structure created in the storage subsystem to the virtual machine.

3. The method of claim 1, wherein the virtual appliance repository, virtual machines with the virtual computing landscape, the storage subsystem, and instantiated virtual appliances are each manageable, at least in part, via the virtual landscape management application.

4. The method of claim 1, wherein executing the attach utility includes:
   installing the virtual appliance on the virtual machine, creating users and setting user access control as defined in the virtual appliance metadata, and setting virtual hostnames.

5. The method of claim 1, wherein determining virtual machines to which the identified virtual appliance can be deployed includes:
   reading the virtual appliance metadata to obtain virtual machine computing requirements thereof; and
   identifying, in data representative of virtual machines under management of the virtual landscape management application, zero to many virtual machines to which the virtual appliance can be deployed.

6. A non-transitory computer-readable medium, with instructions stored thereon, which when executed by at least one processor cause at least one computer to:
   receive, in a virtual landscape management application, data identifying a virtual appliance stored in a virtual appliance repository and data identifying a virtual machine to which the virtual appliance is to be deployed, wherein the data identifying the virtual appliance stored in the virtual appliance repository and the data identifying the virtual machine to which the virtual appliance is to be deployed is received by:
      providing first data via a network for presentation within a user interface, the first data representative of virtual appliances available within the virtual appliance repository;
      receiving the data identifying the identified virtual appliance;
      based on virtual appliance metadata of the identified virtual appliance and on a requirement that the virtual machine have no other software deployed to it other than an operating system, determining virtual machines to which the identified virtual appliance can be deployed;
      providing second data via the network for presentation in the user interface, the second data representative of determined virtual machine to which the identified virtual appliance can be deployed; and
      receiving the data identifying the virtual machine to which the identified virtual appliance is to be deployed;
   connect to a storage subsystem of a virtual computing landscape of the identified virtual machine, create a structure on the storage subsystem within which to store the identified virtual appliance, the structure created according to virtual appliance metadata of the identified virtual appliance, and copy the virtual appliance from the virtual appliance repository to the structure;
   execute an attach utility to instantiate the virtual appliance on the virtual machine according to the virtual appliance metadata and start the virtual appliance once instantiated; and
   register the instantiated virtual appliance with the virtual landscape management application to allow management of the virtual appliance via the virtual landscape management application.

7. The non-transitory computer-readable medium of claim 6, wherein the instructions are further executable to cause the at least one computer to:
   mount the structure created in the storage subsystem to the virtual machine.

8. The non-transitory computer-readable medium of claim 6, wherein the virtual appliance repository, virtual machines with the virtual computing landscape, the storage subsystem, and instantiated virtual appliances are each manageable, at least in part, via the virtual landscape management application.

9. The non-transitory computer-readable medium of claim 6, wherein executing the attach utility includes:
   installing the virtual appliance on the virtual machine, creating users and setting user access control as defined in the virtual appliance metadata, and setting virtual hostnames.

10. The non-transitory computer-readable medium of claim 6, wherein determining virtual machines to which the identified virtual appliance can be deployed includes:
    reading the virtual appliance metadata to obtain virtual machine computing requirements thereof; and
    identifying, in data representative of virtual machines under management of the virtual landscape management application, zero to many virtual machines to which the virtual appliance can be deployed.

11. A system comprising:
    at least one processor, at least one memory device, and at least one network interface;
    a virtual appliance repository module stored in the at least one memory device and executable at least in part by the at least one processor to receive, store, and provide virtual appliances; and
    a virtual appliance management module stored in the at least one memory device and executable by the at least one processor to:
       receive, via the at least one network interface device, data identifying a virtual appliance stored by the virtual appliance repository module and data identifying a virtual machine to which the virtual appliance is to be deployed, wherein the data identifying the virtual appliance stored in the virtual appliance repository and the data identifying the virtual machine to which the virtual appliance is to be deployed is received by:
          providing first data via a network for presentation within a user interface, the first data representative of virtual appliances available within the virtual appliance repository;
          receiving the data identifying the identified virtual appliance;
          based on virtual appliance metadata of the identified virtual appliance and on a requirement that the virtual machine have no other software deployed to it other than an operating system, determining virtual machines to which the identified virtual appliance can be deployed;
          providing second data via the network for presentation in the user interface, the second data representative of determined virtual machine to which the identified virtual appliance can be deployed; and
          receiving the data identifying the virtual machine to which the identified virtual appliance is to be deployed;
       connect, via the at least one network interface device, to a storage subsystem of a virtual computing landscape of the identified virtual machine, create a structure on the storage subsystem within which to store the identified virtual appliance, the structure created according to virtual appliance metadata, and copy the virtual appliance from the virtual appliance repository module to the structure;

execute an attach utility to instantiate the virtual appliance on the virtual machine according to the virtual appliance metadata and start the virtual appliance once instantiated; and register the instantiated virtual appliance with a virtual landscape management application to allow management of the virtual appliance via the virtual landscape management application.

12. The system of claim 11, wherein virtual appliance management module is further executable by the at least one processor to mount the structure created in the storage subsystem to the virtual machine.

13. The system of claim 11, wherein the virtual appliance repository module, virtual machines within the virtual computing landscape, the storage subsystem, and instantiated virtual appliances are each manageable, at least in part, via the virtual landscape management application, of which the virtual appliance management module is a part.

14. The system of claim 11, wherein executing the attach utility includes:

installing the virtual appliance on the virtual machine, creating users and setting user access control as defined in the virtual appliance metadata, and setting virtual hostnames.

15. The system of claim 11, wherein determining virtual machines to which the identified virtual appliance can be deployed includes:

reading the virtual appliance metadata to obtain virtual machine computing requirements thereof; and identifying, in data representative of virtual machines under management of the virtual landscape management application, zero to many virtual machines to which the virtual appliance can be deployed.

\* \* \* \* \*